(12) United States Patent
Lissajoux et al.

(10) Patent No.: US 11,420,730 B2
(45) Date of Patent: Aug. 23, 2022

(54) MANAGEMENT OF AN AIRCRAFT

(71) Applicant: THALES, Courbevoie (FR)

(72) Inventors: Sylvain Lissajoux, Toulouse (FR); François Michel, Merignac (FR); Chris Deseure, Toulouse (FR); Denis Bonnet, Merignac (FR)

(73) Assignee: THALES, Courbevoie (FR)

( * ) Notice: Subject to any disclaimer, the term of this patent is extended or adjusted under 35 U.S.C. 154(b) by 511 days.

(21) Appl. No.: 16/447,533

(22) Filed: Jun. 20, 2019

(65) Prior Publication Data
US 2019/0389565 A1 Dec. 26, 2019

(30) Foreign Application Priority Data

Jun. 21, 2018 (FR) .................................... 1800639

(51) Int. Cl.
| | |
|---|---|
| *G05D 1/00* | (2006.01) |
| *B64C 19/02* | (2006.01) |
| *B64C 13/02* | (2006.01) |
| *B64D 45/00* | (2006.01) |
| *G08G 5/00* | (2006.01) |

(52) U.S. Cl.
CPC .............. *B64C 19/02* (2013.01); *B64C 13/02* (2013.01); *B64D 45/00* (2013.01); *G08G 5/0039* (2013.01); *B64C 2201/148* (2013.01)

(58) Field of Classification Search
CPC ... B64C 19/02; B64C 13/02; B64C 2201/148; B64D 45/00; G08G 5/0039; G08G 5/025; G08G 5/0021; G05D 1/00
USPC .......................................................... 701/3
See application file for complete search history.

(56) References Cited

U.S. PATENT DOCUMENTS

| | | | |
|---|---|---|---|
| 8,983,687 B1 * | 3/2015 | Hunter ................. | G08G 5/0056 701/14 |
| 2012/0078450 A1 * | 3/2012 | Marche ................ | G05D 1/0607 701/6 |
| 2017/0183105 A1 * | 6/2017 | Fournier .............. | G08G 5/0052 |

* cited by examiner

*Primary Examiner* — Shardul D Patel
(74) *Attorney, Agent, or Firm* — BakerHostetler

(57) ABSTRACT

Methods and systems for assisting the piloting of an aircraft are provided. The system includes at least one avionics type system and at least one non-avionics type system. The method includes steps involving receiving avionics type data associated with a flying context of the aircraft; forwarding the avionics type data to a non-avionics type system or computer; determining, in the non-avionics computer, one or more adjustment recommendations for equipment based on the received flying context and/or on predetermined data; displaying one or more recommendations. Various developments are described, in particular the conditions for requesting and/or computing recommendations (e.g. ongoing adjustment of the avionics, similar previous configuration, etc.), the selection and the categorization of recommendations, the handling of adjustment data for the avionics, etc. Software aspects are described.

15 Claims, 3 Drawing Sheets

MANAGEMENT OF AN AIRCRAFT

CROSS-REFERENCE TO RELATED APPLICATIONS

This application claims priority to foreign French patent application No. FR 1800639, filed on Jun. 21, 2018, the disclosure of which is incorporated by reference in its entirety.

FIELD OF THE INVENTION

The invention generally relates to the technical field of avionics and in particular to the methods and systems for managing recommendations, in particular regarding the adjustments of on-board equipment.

BACKGROUND

The management of modern aircraft has become complex. The tasks of a crew generally cover activities involving piloting, communication, navigation and management of the status of the aeroplane. During some operations, the pilot or the crew are completely overwhelmed, even overloaded, with work. In order to reduce the cognitive load of the pilot or to accelerate their decision-making, some approaches aim to automate some aspects of the running of the flight or of the management of the activities that occur in the cockpit of the aircraft.

Since operations deemed to be critical are involved, this assistance can be provided by piloting assistance methods, which are implemented by software. This on-board software is regulated (it is certified).

The on-board software, even though it is reliable and integrated, does not always take advantage of the precision and of the performance that can be provided by solutions based on remote computers, in particular of the non-avionics type, and/or of data originating from sources outside the aeroplane (e.g. collaborative data from multiple sources, etc.).

Published patent literature discloses various approaches for assisting piloting. For example, patent document U.S. Pat. No. 8,983,687 discloses the management of the flight of an aircraft in specific wind conditions. According to this approach, recommendations are transmitted to the pilot on the basis of measurements that are performed and of the operating rules of the aircraft. This type of approach has limitations.

A requirement exists for advanced methods and systems for assisting the management of a cockpit of an aircraft.

SUMMARY OF THE INVENTION

The present invention relates to methods and to systems for assisting the piloting of an aircraft. The system according to the invention comprises at least one avionics type system and at least one non-avionics type system. The method comprises steps involving receiving avionics type data associated with a flying context of the aircraft; forwarding the avionics type data to a non-avionics type system or computer; determining, in the non-avionics computer, one or more adjustment recommendations for on-board equipment based on the received flying context and/or on predetermined data; displaying one or more adjustment recommendations. Various developments are described, in particular the conditions for requesting and/or computing recommendations (e.g. ongoing adjustment of the avionics, similar previous configuration, etc.), the selection and the categorization of recommendations, the handling of data for adjusting the avionics, etc. Software aspects are described.

Advantageously, the method allows data to be exchanged with algorithms that are not on-board (i.e. non-avionic).

Advantageously, the embodiments of the invention allow full advantage to be taken of technologies originating from the "open world" (performance, upgradability, cloud computing type remote resources, etc.), whilst meeting avionics type criteria (e.g. aeronautical security and safety). Advantageously, the invention allows advantage to be taken of substantial and diversified data. Advantageously, the invention allows advantage to be taken of human-machine interaction methods and systems that are modern, reliable, robust, proven, even de facto standard, with a rapid learning curve (e.g. force feedback touch screens, enhanced and/or virtual reality).

Advantageously, the invention allows access to data over open networks, while minimizing the risks in terms of intrusion or of the introduction of unreliable data.

Advantageously, the use of one or more external computers allows the benefit of enhanced mission management, accompanied by secure exchange means, and of comparison and verification means to be enjoyed, allowing a reliable and easy transition to the avionics navigation computer and the execution of the mission.

Advantageously, the invention can be applied to the flight or mission management of an aircraft, whether it is before or during the flight or after the flight.

Advantageously, the invention can be implemented on tablets that can be used on board or on the ground away from the aeroplane. It can be deployed on EFBs on board the aeroplane. It also can be offered on the ground in the company operation control centres, while ensuring exchanges with the avionics through the ground-on-board data link functions. In a particularly advantageous embodiment, the invention can be implemented on a non-avionics computer and displayed on avionics screens in the cockpit.

BRIEF DESCRIPTION OF THE DRAWINGS

Various aspects and advantages of the invention will become apparent with reference to the description of a preferred but non-limiting embodiment of the invention, with reference to the following figures.

DETAILED DESCRIPTION

Figure 1:
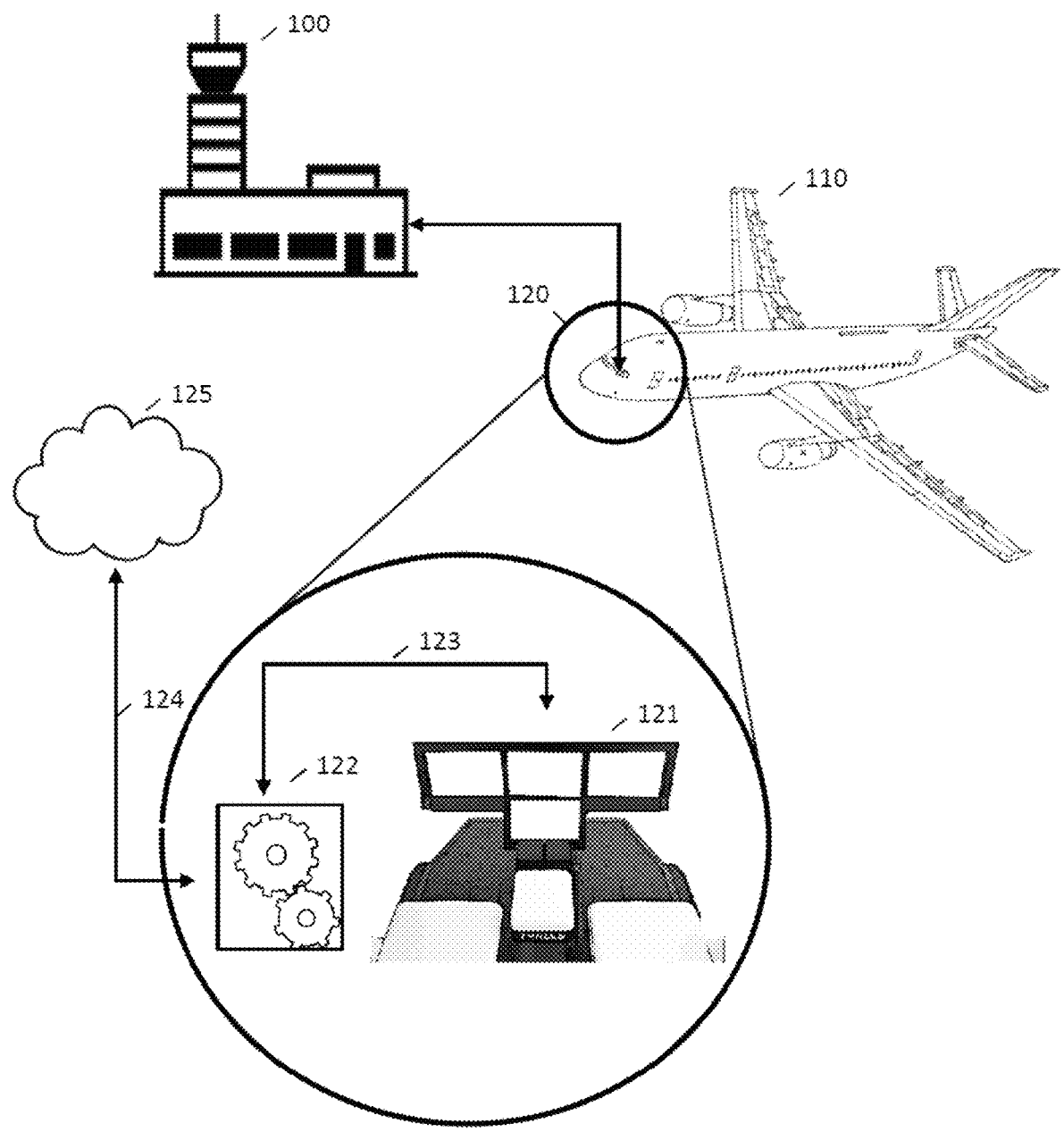
FIG. 1 illustrates the overall technical environment of the invention.

A "recommendation" is generally non-binding but generally connotes that it results from a computation process invested with a certain degree of confidence and it generally aims to achieve or to meet one or more previously known, computed or computable objectives.

In addition, or as an alternative, to this term, several other terms can be used (with different connotations).

According to the embodiments, the method according to the invention can handle a "proposition" (e.g. in response to an explicit request, for example, the result of a computation) or a "suggestion" (completely optional invitation as opposed to an order, generally intending to influence) or "advice" (e.g. that could indicate an insufficient confidence level) or a "candidate result".

The term "suggestion" generally can be replaced by the term "recommendation" throughout the document. The term "suggestion" connotes a nonbinding invitation, which generally aims to influence and which can be agnostic or non-committal relative to an objective to be achieved. Some piloting models leave the final choices to the human and the terms "suggestion" or "proposition" are more moderate.

In general, it is possible to associate one or more attributes with one or more recommendations, for example, categorized according to the reliability and/or the priority and/or the criticality of the sources of information on which they are based (and/or relating to the entity handling the data). Optionally, the messages or recommendations can be classified or discretized into a plurality of classes or categories, each being associated with one or more predetermined attributes. Various classification criteria therefore can be applied to select and determine the rank or the score of one or more recommendations.

A recommendation may or may not be followed by actions (e.g. for running or for piloting), which may or may not relate to the content forming the basis of the recommendation. It is possible to monitor a given suggestion or recommendation (for example, by performing a comparison between the actual actions and the recommended actions).

In general, the embodiments of the invention can be in an "open loop" and/or in a "closed loop". An open loop is understood to mean that human intervention is required (e.g. the pilot must confirm one or more intermediate steps of the method). A closed loop is understood to mean that some operations, which can, for example, be quantified in terms of the confidence level, of aeronautical security and/or safety, may not require human approval (at least directly). Indeed, some steps can be verified by algorithms (that therefore "internalize" some decision-making elements of the human pilot into the machine). It is understood that the adjustment modes can combine open loops and closed loops and that the feedback can evolve over time, due to regulatory constraints in particular, but not only due to these constraints (human learning model, maintaining non-automatable piloting skills, etc.).

In its form, a recommendation can, for example, include one or more words, stated in the form of text through graphic display or through voice synthesis or through any other sensory means. A series of words can form a phrase or an instruction (optional or activatable). For example, a recommendation can include text components originating from a regulatory flight procedure. A recommendation can include one or more assorted digital values of measurement units (for example, a flight level expressed in feet, a result, a target value, etc.). A recommendation can include one or more symbols, a graph, a curve, a 2D or 3D plane, a course, a direction or any other element of a symbolic nature (pictogram, etc.). A recommendation can assume the form of lists, tables, choices to be made, etc. A recommendation can be executable (for example, by a computer), for example, following acceptance or confirmation of the recommendation by the pilot or another designated member of the crew.

A recommendation can relate to any possible entry into the avionics. For example, a recommendation can relate to the background: piloting-related entries; communication-related entries (pre-adjustments of HF or VHF radio frequency, messages to be sent to the ATC, e.g. reporting times, point of passage, speed, etc., messages to be sent to the traffic control, messages to be sent to the cabin, messages to be sent to other aircraft, etc.); navigation-related entries (names of points of passage or of airports, guidance instructions or adjustments of parameters, barometric pressure adjustments, navigation procedures); flight management-related entries (operational procedures or parts of procedures to be performed, actions to be performed on the systems of the aircraft, e.g. illumination of an illuminated instruction, screen intensity adjustment, etc.).

Whether it is a matter of a recommendation in terms of piloting, communication, navigation and/or management of the status of the aeroplane, all are ultimately expressed by the tangible handling of on-board equipment. The "adjustment of equipment" is therefore an obvious and tangible variable of a computation process and/or of intangible reasoning, of machine and/or of human origin.

FIG. 1 illustrates the overall technical environment of the invention.

The figure shows examples of systems (or "equipment" or "instruments" or "hardware" or "devices" or "means") of the "non-avionics" or "open (world)" type and of equipment of the "avionics" type (certified by the regulator).

An aircraft is a means of transport capable of moving within the atmosphere of Earth. For example, an aircraft can be an aeroplane or a helicopter (or even a drone). The aircraft comprises a piloting cabin or a cockpit 120. On-board equipment 121 (called avionics equipment), which is certified by the aviation regulator during the design of the aircraft (issuance of a TC or STC), and non-avionics (or "open world") equipment, the use of which is validated by the authorities when the operations are approved, is located within the cockpit.

Avionics

The avionics equipment (hereafter called "the avionics") 121 includes, for example, one or more on-board computers (means for computing, recording and storing data). For example, the equipment 121 can comprise a Flight Management System (FMS), an "autopilot", a radio communication system, "safety nets", a warning system, a maintenance system, and human-machine interface (HMI) means.

The HMIs can include display means (e.g. screens incorporated in the avionics equipment, optionally tactile, projectors, etc.) and/or data entry means (e.g. keyboards, buttons, cursors, rotary controls, etc.), audio means (e.g. microphone, speakers, cones, etc.), communication or haptic feedback means.

By extension, the avionics systems can include remotely accessible systems, for example, the air traffic control systems that can be in communication (bilateral) via the ground-on-board links. Furthermore, the air traffic control 1001 and/or operation control centre systems can access (e.g. receive, gather, select, cross-reference, determine) data sources of the open type (e.g. non-regulatory type meteorological data), for example, accessible from the Internet network. This open network is characterized by its coverage (i.e. the diversity of the subjects) and its depth (the level of accessible detail relating to each subject). Through cross-checking, it is possible to enhance (e.g. supplement, contextualize) avionics information (e.g. in terms of the management of NOTAMs).

An avionics type system can include, for example, flight data concentration systems (FDAU), inertial unit systems (IRS), maintenance computer systems (CMS), flight management systems (FMS), a warning system (FWS), a radio management system (RMS), an anemo-barometric unit system (ADU), an autopilot system (AFCS), or even a display system ("Integrated Cockpit Display System").

Non-Avionics

Non-avionics systems 122 particularly denote one or more computers (on-board or ground based), open world display means (e.g. additional screens, connected glasses, heads-up displays, projectors, holographic systems, virtual and/or enhanced reality helmets, called "wearable computers" or "head-mounted displays", etc.), as well as interaction means (e.g. laser projection, foldable, rollable keyboards; haptic, force feedback, mechanical, pneumatic, electrical systems; dictation or voice recognition means with noise suppression, etc.). The computation resources particularly can include one or more tablet computers or EFB ("Electronic Flight Bag"), that are portable or are integrated in the cockpit.

Technical Definitions

The avionics and non-avionics equipment can be characterized in a technical manner.

An "avionics system" (or "avionics type system") is a system exhibiting specific technical features compared to a "non-avionics" system (or "non-avionics type system" or "open world" system).

With respect to the distinctive technical features of an avionics system, in general a system, i.e. an avionics or non-avionics system, can have or be associated with a predetermined failure rate (from a predetermined range of failure rates), with a failure rate including or determining a predetermined execution error rate. In one embodiment, the failure rate of an avionics type system is less than the failure rate of a non-avionics type system. In one embodiment, the predetermined failure rate of an avionics system is significantly or substantially less than that of a non-avionics system.

An avionics system denotes a reliable system (or with guaranteed reliability). It is a system for which the consequences of failure exceed accepted or acceptable, and therefore critical, limits. A failure can be characterized by the loss of the considered function or by the production of erroneous data, with or without error detection. The failure of a system can be perceived in a deterministic manner, but also in a probabilistic manner. Depending on the level of criticality of the critical consequences, the occurrence probability must be kept below an acceptability threshold. Thus, the more critical the consequence, the lower the acceptable occurrence probability. For example, in aeronautics, a catastrophic event (multiple deaths) must have an occurrence probability below 10^-9 per flight hour, whereas a major incident (reduction of security margins and of operational capacities, discomfort or slight injuries) must have an occurrence probability below 10^-5 per flight hour. In order to meet these objectives, the architecture of the avionics system (reliable), as well as the design of each component, guarantees this occurrence probability through failure rate guarantees for each item of equipment (physical breakdowns) and through verification levels (functional and structural test coverage) of the software.

These requirements require considerable effort in terms of design and of verification and impose a limit on the complexity of the processing that is implemented.

Conversely, the failure of a non-reliable system, where the reliability is not guaranteed (non-avionics system) has consequences that are considered to be tolerable, non-critical, or even without any significant operational impact. The requirements with respect to the architecture, the physical components or the software processing operations are therefore lower and allow more complex processing operations, and less effort in terms of development and of verification compared to a reliable system.

In general, an avionics system is associated with a rate of physical failure that is less than, and a logic verification that is greater than, those of a non-avionics type system.

In order to use data originating from a non-reliable computer during flight operations, since the reliability of the data is not guaranteed (or is guaranteed with an error rate that is greater than the requirements of the reliable system), it is advantageous for the method according to the invention to be used.

The steps of the method particularly ensure that no erroneous data is used operationally by the reliable system. The steps can include verification by the human operator, following manual entry or an automatic transmission, or even various means for verifying transmitted data. In some embodiments, it is also possible to have steps of computing or of verifying the coherence of the data of the non-avionics system that are undertaken by the avionics system (for example, it is possible to verify that a trajectory is constructed with known points and that it is flyable).

In one embodiment, one or more recommendations determined by the method according to the invention are displayed, then confirmed by the pilot before being implemented (semi-open loop). In particular, predetermined types of recommendations can systematically require human confirmation before being reintroduced into the avionics piloting systems. In one embodiment, one or more recommendations determined by the method according to the invention are displayed, then executed or implemented immediately (closed loop cycle). In particular, predetermined types of recommendations can undergo fully automated processing. In other words, in addition to the automation, a manual adjustment of the proposed solution can be required of the operator.

In one embodiment, an additional comprehensiveness criterion allows the criterion of the failure rate to be qualified. This comprehensiveness criterion denotes the coverage of the tests and/or verifications (e.g. comparison of the produced response with that which is known and expected), which have been previously performed on the avionics system or on the non-avionics system in determining the failure rate. In one embodiment, the comprehensiveness of the tests and/or verifications that are performed is greater in an avionics system compared to a non-avionics system.

In one embodiment, in addition to the overall failure rate of the avionics system or of the non-avionics system, the failure rates specific to the components of the avionics system or of the non-avionics system can be taken into account, as can the propagation of the failures.

Equipment of the non-avionics type can interact (unidirectional or bilateral communication 123) with the avionics equipment 121.

One or more non-avionics systems can also communicate 124 with external computer resources that are accessible through the network (for example, "cloud computing" 125). In particular, the computations can be performed locally on an on-board open computer and/or on an EFB or partially or fully in the computation means accessible via or through or in the network.

The design of the on-board equipment 121 is generally certified and regulated, whereas the EFB 122 and the connected computer means 125 are not generally certified and regulated, only the use thereof is approved. According to the embodiments (integration types 123), the architectures that can be implemented allow flexibility and operational capacities to be introduced on the open world side (e.g. via the EFB 122), while providing security (controlled) on the on-board avionics 121 side.

Embodiments are described hereafter.

In one embodiment, a method is described for managing the adjustment of the equipment in the cockpit of an aircraft implemented in a system comprising an avionics type system and a non-avionics type system, the method comprising the following steps: —receiving avionics type data associated with a flying context of the aircraft; —forwarding the avionics type data to a non-avionics type system; —determining, in the non-avionics system, one or more adjustment recommendations for one or more items of equipment in the cockpit based on the received avionics type data, on the flying context and/or on predetermined data; —rendering one or more adjustment recommendations for one or more items of equipment in the cockpit, in a visual and/or audible and/or tactile and/or vibratory manner.

In one embodiment, the method further comprises steps involving receiving a request with a view to obtaining one or more adjustment recommendations, and verifying predetermined conditions of said request, said predetermined conditions comprising or indicating ongoing or imminent avionics adjustment activity by the crew and/or the validation, by a sub-party, of the contained data within the context of predetermined logic rules.

In one embodiment, the method further comprises a step involving selecting one or more recommendations from the determined adjustment recommendations, the selection criteria comprising degrees of reliability or confidence intervals associated with the various sources of the avionics and/or non-avionics data.

In one embodiment, the predetermined data comprises avionics data relating to the operating aircraft and/or non-avionics data particularly comprising data relating to ground-based equipment, data supplied by one or more users, logged recommendations or data relating to one or more predetermined flight procedures.

In one embodiment, the step involving determining an adjustment recommendation is performed in a non-avionics type system and/or in an avionics type system.

In one embodiment, the method further comprises the step involving determining a flying context similar to the received flying context, the rendered and/or determined recommendations comprising the adjustment recommendations associated with the similar flying context.

In one embodiment, an adjustment recommendation assumes the form of the completion of an adjustment of equipment that is being edited requiring a single validation.

In one embodiment, the rendering of an adjustment recommendation is performed by graphic display means on one or more existing screens in the cockpit and/or by projecting information into the cockpit.

According to the embodiments, the graphic display can be centralized on a single screen. It also can reuse the various screens of the cockpit, by distributing the information (using, for example, the screens closest to the equipment to be adjusted). Advantageously, the display of an adjustment recommendation is located together with the equipment to be adjusted. In one embodiment, the display is performed by laser projection.

In one embodiment, one or more predetermined display screens are used.

The roles of the various crew members can vary in the space and over time. For example, the "flying pilot" denotes the pilot at the controls and the "non-flying pilot" denotes the pilot who monitors the actions of the first pilot. The two pilots do not necessarily need the same information.

In one embodiment, a projector displays accessibility information regarding one or more items of equipment associated with one or more of the adjustment recommendations.

Furthermore, some equipment may be accessible, some may not be accessible. For example, deicing commands may not be able to be activated in certain flying conditions. In one embodiment, the method comprises a step involving projecting, onto the screens arranged in the cockpit, information relating to the accessibility of the various equipment (e.g. a laser beam can frame the available equipment or, by contrast, "stripe" the unavailable devices). In other words, by superimposing images or by using enhanced reality techniques, it is possible to reconfigure the actual image.

In one embodiment, the step of rendering an adjustment recommendation is deferred over time.

According to the embodiments, several reasons can be behind offsetting the rendering over time, in particular additional verification steps, the management of the cognitive load and/or the measured attention of the pilot, the staggering of the transmitted recommendations over time, etc.

In one embodiment, an avionics system is associated with a rate of physical failure that is less than, and a logic verification that is greater than, those of a non-avionics type system.

In one embodiment, an avionics system is associated with a comprehensiveness of tests and/or of verifications that is greater than those of a non-avionics type system.

Figure 2:
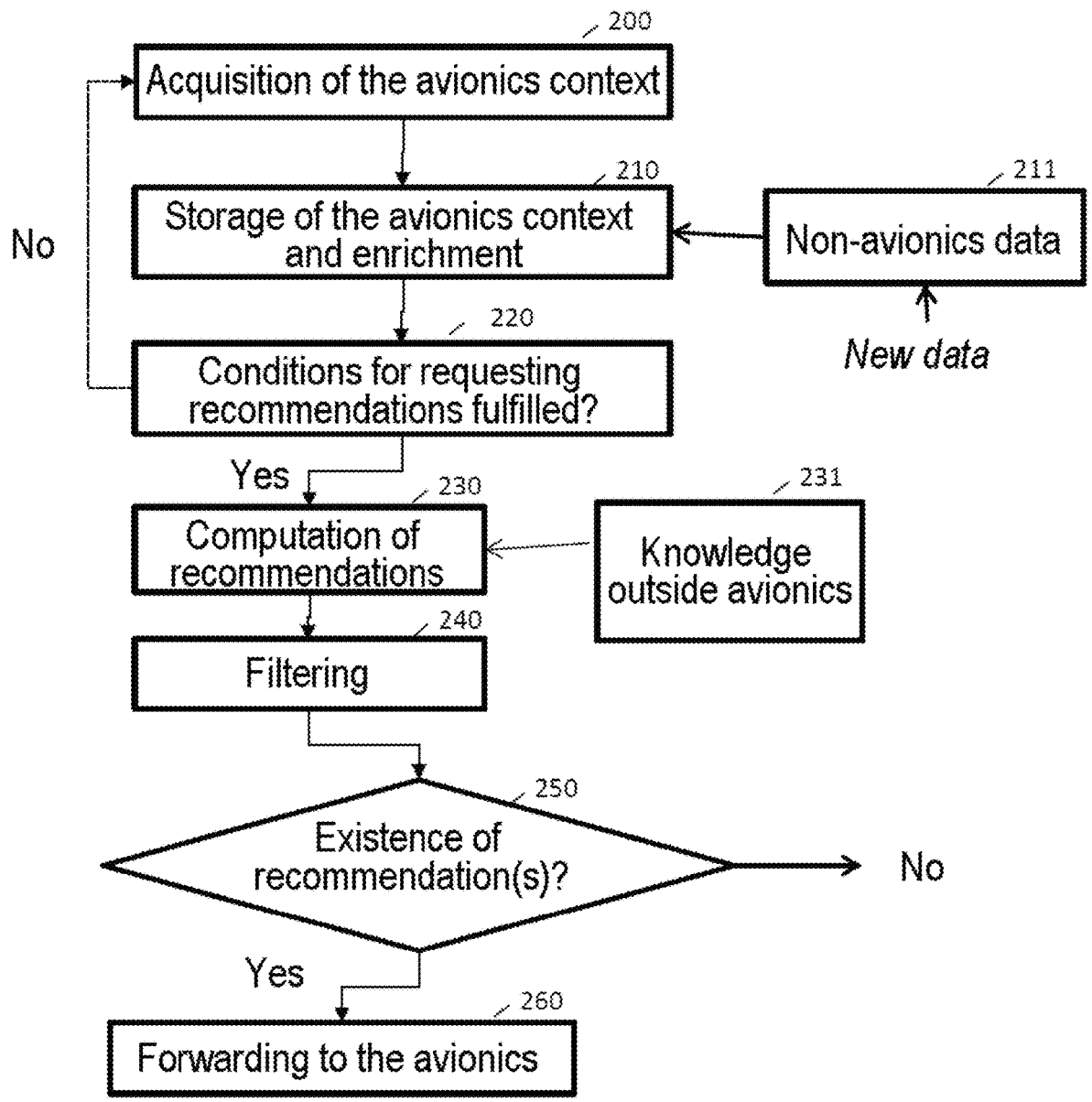
FIG. 2 shows examples of steps of an embodiment of the invention.

FIG. 2 shows an example of an embodiment of the invention.

In one embodiment, the avionics context (i.e. all the avionics type data relating to the aircraft) is determined and/or forwarded from the avionics systems to the non-avionics systems, at predetermined time intervals.

Data can be forwarded in various ways: cyclically or periodically (for example, every three seconds), non-periodically (for example, triggered by the occurrence of an event and/or by applying a predetermined logic rule), intermittently (for example, as a function of operations that are fairly critical during flight), opportunistically (for example, under satisfactory network connectivity conditions, etc.).

The hardware equipment that allows the logic steps of the method to be implemented can be accessed locally and/or remotely. For example, the equipment can be "on-board", i.e. can be found locally on board the aircraft or in the cockpit thereof. The computation resources also can be accessed remotely. For example, the equipment can be located on the ground or can even be distributed in another manner ("cloud computing").

In one embodiment, the method comprises a step involving taking into account the "flying context" in order to determine and/or forward adjustment recommendations of one or more items of on-board equipment (dials, buttons, actuators, slides, screen entries, rotary controls, etc., as well as the recipients, rendering terms, etc.).

The use of the flying context advantageously allows the combinational logic to be reduced, in order to reduce the space of the possibilities in the steps involving generating, combining, filtering, assessing, classifying, selecting the recommendations (or the combinations of recommendations).

The "flying context" of the aircraft includes various types of data, in particular geo-referenced type data (e.g. position of the aircraft, latitude, longitude, altitude, orientation and speed, etc.), data relating to the air mass (speed, pressure, altitude, etc.) and data relating to the avionics systems (e.g.

type of device, performance, status of the systems, ongoing adjustment, audio communication data, etc.).

The flying context of the aircraft particularly comprises the flight phases (e.g. climb, descent, cruise, take-off, landing, etc.), but also the time periods on the ground (e.g. taxiing, maintenance, etc.).

The method according to the invention can comprise logic methods or steps for determining the "flying context" or "current flying context" of the aircraft.

The flying context at a given moment includes all the actions taken by the pilots (and particularly the effective piloting instructions) and the influence of the environment outside the aircraft. A "flying context" includes, for example, one situation from among predetermined or pre-categorized situations associated with data such as the position, the flight phase, the points of passage, the ongoing procedure (among others). For example, the aircraft can be in an approach phase for landing, in a take-off phase, in a cruise phase, but also in a steady climb, steady descent, etc. (a variety of situations can be predetermined). Furthermore, the current "flying context" can be associated with many attributes or descriptive parameters (current meteorological status, traffic status, pilot status, including, for example, a stress level as measured by sensors, etc.).

A flying context therefore also can comprise data, for example, filtered according to priority and/or based on flight phase data, meteorological problems, avionics parameters, ATC negotiations, anomalies associated with the status of the flight, problems associated with traffic and/or relief. Examples of "flying context" include, for example, contexts such as "cruising state/no turbulence/nominal pilot stress" or even "landing phase/turbulence/intense pilot stress". These contexts can be structured according to various models (e.g. ranked, for example, as a tree structure or according to various ancillary items, including graphs). Categories of contexts can be defined in order to synthesize the requirements in terms of human-machine interaction (e.g. minimum or maximum interaction delay, minimum and maximum number of words, etc.). Specific rules also can remain in some contexts, in particular in emergencies or critical situations. The categories of contexts can be static or dynamic (e.g. configurable).

The method can be implemented in a system comprising means for determining a flying context of the aircraft, said determining means particularly comprising logic rules, which handle values as measured by physical measuring means. In other words, the means for determining the "flying context" include system means or "hardware" or physical/tangible and/or logic means (e.g. logic rules, for example, predetermined logic rules). For example, the physical means include the avionics instruments strictly speaking (radar, probes, etc.) that allow factual measurements to be established that characterize the flight. The logic rules represent all the processing operations for the information for interpreting (e.g. contextualizing) the factual measurements. Some values can correspond to several contexts and, by correlation and/or computation and/or simulation, it is possible to share candidate "contexts" using these logic rules. A variety of technologies allows these logic rules to be implemented (formal logic, fuzzy logic, intuitionistic logic, etc.).

This context results from the aggregation, the juxtaposition or the combination of data from various sources.

In one embodiment, the determined avionics context is forwarded to one or more computers responsible for adjustment recommendations (e.g. piloting).

In one embodiment, an adjustment recommendation computer determines an adjustment recommendation by similarity. In one embodiment, the similarity is textual. In one embodiment, the similarity is by category.

In one embodiment, the similarity is governed by applying predetermined logic rules. The logic can be Boolean logic, zeroth-order logic, first-order logic, predicate logic, intuitionistic logic, connectionist logic, fuzzy logic.

In one embodiment, an adjustment recommendation computer can determine a piloting recommendation in the absence of any request from the pilot.

In one embodiment, the method comprises a step involving receiving an adjustment recommendation request. For example, the pilot can request such assistance. A machine thus can take the initiative of requesting such a recommendation for the benefit of the pilot.

In one embodiment, in response to receiving an adjustment recommendation request, one or more adjustment recommendations are determined.

Several parameters allow an adjustment recommendation to be determined.

A first parameter is found in the knowledge of the avionics context. A second parameter is found in the historical data of the determined adjustment recommendations.

According to the embodiments, the number of determined and/or displayed adjustment recommendations is configurable. This number can be indeterminate. In order to avoid cognitive overload of the pilot, a maximum number of adjustment recommendations can be determined or predetermined. In some contexts, a minimum number of recommendations can be determined or predetermined. For example, in response to receiving a request to adjust a radio frequency, the method can determine a plurality of usable or adjustable frequencies from a plurality of frequencies, with each of these frequencies being associated with a respective confidence level, for example.

In one embodiment, various conditions govern the forwarding of an adjustment recommendation to the avionics type equipment.

For example, in response to receiving a request to adjust a radio frequency (for example, an audio communication with the air traffic controller), an algorithm, stored on a non-avionics resource and using voice recognition, can compute the value of a radio frequency to be selected. The method can determine the compatibility of this result with the current applicable aeronautical rules (for example, in terms of spacing, or frequency bands). The rules that are applied can depend, for example, on the type or on the category of considered aircraft and/or on the operation of the considered piloting.

The adjustment recommendations that are thus determined can be selected (e.g. filtered, ordered, ranked, weighted, etc.) in various manners, in particular by means of avionics and/or non-avionics data (external data). For example, a database providing the possible frequencies associated with the geographical zone in which the aircraft is located. This external data can be constructed using aeronautical data (for example, of the "Database 424" type), or even can be data entered by other users. In one embodiment, on completion of the selection or of the filtering, if one or more possible frequency recommendations remain, that with the best confidence level is sent to the avionics (in other words, the selected data can be selected in turn, over-selected, etc.).

This demand or request is subsequently sent to one or more algorithms that will construct recommendations on the basis of the context and/or of predetermined knowledge (mainly non-avionics knowledge). These algorithms can return an indeterminate number of recommendations (positive). These algorithms are formed, for example, by a voice recognition algorithm that will identify the request for the adjustment of a new radio frequency. These algorithms optionally can return several recommendations in the form of frequencies to be adjusted accompanied by confidence levels. These algorithms can be stored in equipment on board the aircraft or on the ground.

A condition for sending to the avionics will be subsequently computed for each transmitted adjustment recommendation. For example, for each radio frequency type adjustment recommendation originating from a source using voice recognition, the compatibility of the result with the aeronautical rules applicable to the type of aircraft/operation is verified (spacing, frequency band, etc.). The adjustment recommendations are then filtered using, for example, databases providing the possible frequencies associated with the geographical zone in which the aircraft is located. These databases can be constructed using aeronautical data ("Database 424"), or data entered by other users. On completion of this filtering, one or more possible frequency recommendations remain, the recommendation with the best confidence level is sent to the avionics.

The adjustment recommendations are sent to the avionics in order to be optionally submitted to the crew, which has the possibility of confirming (in order to be taken into account by the system), rejecting and/or deferring their decision to a later time. For example, a frequency recommendation preferably will be displayed on the equipment used to adjust radio frequencies. Ideally, the avionics has means for verifying the recommendations before displaying them. For example, it can verify the format (type, range, etc.) of the data that it receives.

In a first step 200, the avionics context is determined.

The context associated with a type of recommendation is sent from the avionics of the aircraft (e.g. IRS, FWS, FMS), then transmitted to a non-avionics storage algorithm. This "non-avionics" algorithm can be locally stored in the aircraft on a computer (dedicated computer, Electronic Flight Bag or EFB, etc.) or on a remote ground-based resource (remote servers, cloud, etc.).

In one embodiment, an avionics context is determined from a plurality of predetermined contexts. In this way, an avionics context can be "adapted" in order to correspond to a type of recommendation or to a set of known recommendations. In other words, the content of an avionics context can be reduced to the data required to develop conditions and to the computation of adjustment recommendations.

The "avionics context" comprises data that includes data transmitted by the sensors of the aeroplane (for example, position, attitude, speed, weather radar data, etc.) and/or data determined by the computers of the avionics (automatic pilot modes and instructions, states of the systems, flight plan, trajectory, time and fuel prediction, etc.).

In one embodiment, the avionics context can be enhanced with non-avionics data (step 210). For example, an "enhanced avionics context" can comprise information representing the congestion of the FIR that are crossed, the messages to the applicable aircrew (NOTAM), flight-related economic data, information relating to the airline (name, type of airline, type of OCC), the crew (e.g. number of training flight hours, ages, etc.), the passengers (e.g. premium customers, expectations or requirements in terms of satellite connection, military or cargo transport, etc.), the aircraft (e.g. type, maintenance history, etc.), data prepared by the crew (e.g. frequency plan, etc.), information available in the logbook, etc.

In one entirely optional embodiment, the "avionics context" can be generated solely on the basis of non-avionics data.

In one step 220, an adjustment recommendation request is determined. The avionics context 200 as determined is forwarded to one or more computers implementing one or more algorithms responsible for proposing adjustment recommendations: the computers have storage capacities and logic information processing capacities for determining one or more recommendations on the basis of one or more avionics contexts. The computation and storage resources can be local (e.g. located on board the aeroplane) and/or remotely accessed (e.g. on the ground, cloud computing, etc.).

In one embodiment, any type of avionics context triggers a computation of one or more recommendations.

In one embodiment, only some types of avionics context trigger a computation of recommendations. In one embodiment, an avionics context must meet one or more predetermined criteria or conditions in order to be able to trigger the computation of recommendations. In other words, requests for recommendations are sent when the context supports a certain number of conditions or parameters or triggers selected from the activation of variables contained in the context indicating an ongoing or imminent avionics adjustment activity by the crew and/or the fulfillment of predetermined logic rules and/or the identification of the determined avionics context with a similar previous avionics context that already led to an adjustment action by a crew.

A trigger can involve activating variables contained in the context indicating an ongoing or imminent avionics adjustment activity by the crew (request triggered). For example, the crew may be in the process of entering the name of a rerouting airport into their system. An instruction for adjusting this parameter (e.g. Boolean operator) then can be transmitted in order to trigger a computation of recommendations. This recommendation can involve completing the name being entered on the basis of the type of aircraft (i.e. compatibility with the airport) and of its geographical position (for example, it will return the identifier corresponding to the closest airport, namely LFBO). In another example, the air traffic control can be in the process of granting a clearance (e.g. altitude clearance) to the aircraft via the ("Climb to reach FL 340") audio; an instruction to activate the audio stream than can be forwarded to a computer implementing voice recognition, which can identify, formulate and propose the adjustment of an altitude instruction FL to 340, which the crew can then confirm in the avionics. This same principle can be applied for other types of instructions (VS for "vertical speed", CAS for "calibrated airspeed" or "computed airspeed" or IAS for "indicated airspeed", HDG for "heading", TRK pour "track", FPA for "flight path angle", M for "mach", ALT for "altitude"). In one embodiment, the method comprises a step involving identifying that the pilot is in the process of executing a flight procedure from among a plurality of predetermined flight procedures and the adjustment recommendation computation can involve determining the next action to be performed.

A trigger can include predetermined rules. Data from among the avionics context data can actually meet one or more predetermined logic rules (e.g. exceedance of predetermined thresholds, output/input in predetermined data ranges, monitoring or surveillance of variation rates, etc.). Compliance with these rules can trigger the adjustment recommendation computation. For example, the analysis of the position of the aeroplane can indicate that said aeroplane is in the process of changing air sector. When this condition is met, a recommendation request then can be triggered and forwarded to a dedicated computer, which then can propose, for example, to the crew an adjustment recommendation for a new radio frequency. In another example, the tracking of the position of the aeroplane can indicate that the aeroplane is approaching a point called "reporting point"; an adjustment recommendation request then can be transmitted by or to the crew, with this adjustment recommendation comprising elements (e.g. "reporting points", etc.). In another example, on the basis of the status of the systems and of the flight phase, an adjustment recommendation request is forwarded to a dedicated computer in order to propose that the crew verifies a predetermined list (for example, a "checklist", before beginning the descent).

A trigger can include the identification of the determined avionics context with a similar previous avionics context that has already led to an adjustment action by a crew. For example, a taxiing "clearance" adjustment recommendation can be determined: this type of operation is statistically common for the ground-based air traffic control during taxiing from a given stand to a given runway.

A combination of the various types of triggers is possible. The computed recommendations, where appropriate, can be adapted, in particular their display terms.

In one embodiment, an adjustment recommendation is displayed in the cockpit at the point, or close to the point, of the initial nominal entry.

In one embodiment, an adjustment recommendation is displayed in the cockpit at one or more predetermined points (for example, at locations dedicated to this use).

In one embodiment, the method comprises a notification step for indicating the existence of an adjustment recommendation, the content of which can be displayed on one or more screens.

In one step 230, the method comprises a step involving determining one or more adjustment recommendations. One or more recommendations can be predetermined for one, several, a few, each or all the requests (or types of requests).

In one embodiment, on receipt of a request, several adjustment recommendations are determined, for example, using predetermined knowledge and/or models (for example, knowledge 231).

In one embodiment, a model is determined by learning (supervised and/or non-supervised, deep learning, etc.). In one embodiment, a model uses one or more predetermined logic rules. Various types of logic can be implemented (conventional logic, fuzzy logic, intuitionistic logic, etc.). One or more expert systems also can be used.

For an expert system, the adjustment recommendation computation can be performed, for example, as follows. Initially, the rule is developed on the basis of data, for example, formed by a chronological list of states of the aircraft (time, 3D position, adjusted frequency), which are acquired cyclically (for example, every three seconds), for a set of N last aeroplanes having moved in a given air sector. A "plane" or a linear border (per flight level) or 3D polynomial to be associated with each frequency is subsequently determined (for example, by means of a regression algorithm). The rule that is thus defined is then applied, on the basis of the current position or of the trajectory of an aircraft (i.e. a succession of positions that indicate that the aeroplane moves towards or away from a border). A computation of the proximity with the border can be performed, for example, on the basis of the speed of the aeroplane (measured or estimated). A computation of convergence towards the border can be performed. When the computed proximity drops below a predetermined tolerance (for example, expressed in terms of distance or of time as a function of the speed) and the convergence condition is valid, then an adjustment recommendation with a view to changing frequency to the frequency associated with the border can be determined.

In one embodiment, a model can be constructed by learning. Data formed by a chronological list of aeroplane states (time, 3D position, adjusted frequency) is acquired cyclically (for example, every three seconds), for a set of N aeroplanes. A learning matrix comprising frequencies can be determined. For example, each line of the learning matrix can represent an aeroplane (a sample), whereas the columns can correspond to the aeroplane positions (or to a grid computed during an intermediate step that cuts the space into cells). Subsequently, a set of polygons can be determined (e.g. by clustering) corresponding to the number of frequencies (or at best separating them).

In other embodiments, other types of learning can be used, in particular supervised learning, such as naïve Bayesian classifications or random forests. Advantageously, this type of learning can allow the most recent data to be positively weighted.

The predetermined knowledge or the previously mentioned models can include various data, in particular the enhanced avionics context and historical data, such as historical data and/or data originating from the open world.

The historical data can include adjusted data relating to the avionics of an operating aircraft (entry log, previous recommendations (accepted or rejected), etc.). For example, the barometric pressure adjustments performed by the operating crews are recorded and associated with the airports where the aircraft are operating, in order to be proposed to other crews operating on these same airports. A confidence level is associated with each recording in order to construct the most probable recommendation. This confidence level can depend, for example, on the age of the recorded data or even on the profile associated with the data producer (software version, level of the user, etc.). For example, the illumination of the "fasten seatbelt" panel is recorded and associated with the geographical zone in which the aeroplane is located in order to identify areas of turbulence, in order to warn the next aircraft to enter this zone. As before, a confidence level can be associated with each zone that is thus developed.

The historical data can comprise data adjusted on ground-based equipment (ATC/AOC/Airport/FBO). For example, the establishment of holding patterns requested by the air traffic controllers of a sector for the aircraft in their area are recorded and associated with a set of contextual data (congestion of the zone, profile of the air traffic controller, date, etc.). This data will be subsequently combined with an extrapolation of the current situation in order to suggest to the crews adjustments for their cruising speed in order to anticipate and avoid the establishment of holding patterns. Data generated by avionics equipment, for example, the trajectories or the flight plan flown by the aircraft, is recorded so that the most probable (or the most recent) for reaching two precise points is suggested to the crew.

The data available in the open world can include data voluntarily suggested by users (ground or on board). For example, the crews report clear air areas of turbulence when they encounter them during flight. This data is subsequently aggregated in order to construct geographical zones representing this turbulence. As before, a confidence level can be associated with each zone that is thus developed. Subsequently, recommendations for changing the flight level, adjusting the speed of the aircraft, illuminating illuminated instructions, etc. could be performed before an aircraft enters such a zone.

The data that is available in the open world can include data originating from non-avionics sensors. For example, ground-based weather radar allow the "wind shear" present on an approach to be detected.

The data available in the open world can include data that is per se known or is provided by third-party services. For example, based on the data contained in the flight manuals, combined with the weather conditions of the day and with the configuration of the aeroplane, recommendations for the adjustment of the characteristic speeds for take-off (V1, V2, VR, etc.) could be proposed to the crew.

The computation resources for determining the adjustment recommendations can be located in the on-board devices (e.g. locally, on-board) and/or be remotely accessed (e.g. cloud computer). Optionally, the stated computation resources can be of the avionics type (i.e. use hardware and/or software certified by the aviation regulator).

In one embodiment, after the computation, the format (syntactic) and/or the functional coherence of a determined adjustment recommendation can be verified (e.g. for one or more recommendations, for example, for each recommendation systematically). For example, a verification can be performed to check that a speed instruction recommendation (CAS) is located in the field of aeroplane flight for a given configuration (flight phase, aerodynamic configuration, mass, centring, status of the systems, etc.). In the event of non-conformity, the determined adjustment recommendation will no longer be transmitted to the avionics. In other words, logic tests can be conducted and determine the subsequent processing.

In one embodiment, the method according to the invention comprises a step 240 involving selecting and/or filtering one or more adjustment recommendations. In an optional step 250, a verification can be performed as to whether at least one adjustment recommendation exists. In general, the combinational logic and the history are such that numerous adjustment recommendations can exist. In some cases, an adjustment recommendation nevertheless may not exist.

The adjustment recommendations proposed on the basis of the avionics context and of the predetermined knowledge can be of different types, particularly comprising pre-adjustments of HF or VHF radio frequency; messages to be sent to the ATC, for example: reporting time, point of passage, speed, etc.; messages to be sent to the OCC "Operation Control Centre" or FBO "Fixed Based Operator", or even the MRO "Maintenance Repair and Overhaul"; messages to be sent to the cabin (intended for the "cabin crew" or for the "passengers"); messages to be sent to other aircraft (for example, the presence of "Clear Air Turbulence"); names of points of passage or of airports; guidance instructions; barometric pressure adjustments; navigation procedures (approach, take-off, runway selection, taxiway); operational procedures or parts of procedures ("checklist", "normal/abnormal procedure") to be performed; actions to be performed on the aircraft systems (illumination of illuminated instruction, adjustment of screen intensity, etc.) or technical or operational documents to be consulted (FCOM, OEB, etc.).

In one embodiment, several adjustment recommendations and/or sources of adjustment recommendations are used. In one embodiment, a confidence level or interval is associated with an adjustment recommendation (or a score or a note or a priority or any other type of weighting). A confidence level can depend on several factors, optionally in combination.

For example, a confidence level can depend on the estimated performance of the source. This performance can be determined, for example, using the operational feedback, i.e. the acceptance or the rejection by the users of the various recommendations that have been made. In one embodiment, the more the level of accepted recommendations increases, the more the confidence level increases. A confidence level also can depend on a self-assessment (declaration) of the relevant adjustment recommendation source (for example, confidence level transmitted by a voice recognition algorithm or by a collaborative source, for example, the level depending on the number of users associated with a geographical zone). A confidence level also can depend on the user/crew profile for which the recommendation will be made (consideration of the preferences of a particular user; for example, a user may wish not to receive recommendations in the form of verification lists). In one embodiment, the confidence level has a threshold (for example, if no adjustment recommendation reaches a minimum confidence level (e.g. 50%), the recommendation is not forwarded or displayed. In one embodiment, the adjustment recommendations are sorted or ordered according to their associated confidence levels, a classification (optionally weighted) is performed to select one or more recommendations, which can be forwarded or displayed.

In one embodiment, the method comprises a step involving forwarding 260 one or more adjustment recommendations to the avionics systems.

Various embodiments are possible. In one embodiment, any adjustment recommendation is forwarded. In one embodiment, the sending of an adjustment recommendation is deferred, in order to be triggered at the most convenient time for the crew. For example, spontaneous recommendations can be forwarded so as not to interrupt an ongoing task (for example, when checking a list ("checklist") and/or for limiting the impact on the work load during overloaded or critical flight phases (approach, landing, etc.).

In one embodiment of the invention, a determined adjustment recommendation can be forwarded to one or more specific members of the crew. For example, a frequency adjustment recommendation will be addressed to the "not flying" pilot, whereas a "DIR TO" recommendation will be addressed to the "flying" pilot.

In one embodiment, forwarding 260 comprises a step involving displaying one or more adjustment recommendations, in a graphic and/or multimodal manner (auditory, tactile, vibratory, etc.).

In one embodiment, an adjustment recommendation is displayed for the crew at the point, or close to the point, of entry of the adjustments.

In one embodiment, an adjustment recommendation associated with the ongoing editing is displayed for the crew at the point of entry of the adjustments. In one embodiment, an adjustment recommendation associated with a predetermined context is displayed for the crew in a specific graphic zone (notification).

In one embodiment, an adjustment recommendation is displayed on/in the avionics and can be confirmed through an action of the crew (e.g. pressing a button) before becoming an adjustment of the avionics equipment.

In one embodiment, an adjustment recommendation is displayed on/in the avionics and can be removed from the system through an action of the crew e.g. pressing a button, definition of a new adjustment level with the conventional avionics interfaces.

In one embodiment, the flying context contains audio recordings and the computation of an adjustment recommendation uses voice recognition.

In one embodiment, the transmission step is temporally deferred, for example, in order to optimize the work load.

In one embodiment, the transmission step is performed towards one or more specific members of the crew of the aircraft. In one embodiment, the transmission step is performed towards one or more passengers of the aircraft.

Various embodiments are described hereafter.

In one embodiment, the method for assisting the piloting of an aircraft implemented in a system comprises at least one avionics type system and at least one non-avionics type system and the method comprises the following steps: receiving avionics type data associated with a flying context of the aircraft; forwarding the avionics type data to a non-avionics type computer; determining, in the non-avionics computer, one or more adjustment recommendations based on the received flying context and/or on predetermined data; displaying one or more adjustment recommendations.

In one embodiment, the method further comprises a step involving verifying predetermined conditions for requesting an adjustment recommendation by using the received flying context, said predetermined conditions comprising the activation of variables contained in the flying context indicating ongoing or imminent avionics adjustment activity by the crew, the validation, by a sub-party, of the contained data within the context of predetermined logic rules.

The predetermined conditions can comprise one or more conditions selected from: a) the activation of variables contained in the context indicating ongoing or imminent avionics adjustment activity by the crew (triggered request); b) predetermined rules or conditions (e.g. a set of logic rules (exceedance of predetermined thresholds, output/input in pre-established data ranges; monitoring of the rate of variation, etc.); and c) the matching or identification of the flying context with a similar previous context that already led to an adjustment action by a crew.

In one embodiment, the method further comprises a step involving selecting said one or more recommendations from the determined adjustment recommendations.

Recommendations can be selected through various means. The most relevant recommendations can be selected by means of predetermined rules. Predetermined thresholds or ranges of predetermined thresholds can be used. Information associated with the selected recommendations can be displayed, according to the same principles of rules, thresholds and scores. In particular, the most compact information, for example, the information that is predetermined as being necessary and sufficient, can be rendered in one way or another.

The recommendations can be previously categorized or classified. The recommendations can be classified through various means. The recommendations can be originally associated with metadata indicating their category or their member group (in other words the type of recommendations can be predetermined). The classification also can result from work analyzing received data (detection of keywords, or heuristic analyses, "taggers", "classifiers", etc.).

In general, the recommendations can be ranked (trees or graphs). The recommendations can have different abstraction levels. The recommendations can be independent of one another. In other cases, the recommendations can be dependent or interdependent.

The selection of recommendations can be static or dynamic (it can result, for example, from the application of rules, which can be different and specific to said sensory rendering, e.g. "scoring" of the best cognitive channels for forwarding a particular type of category of information).

In one embodiment, an adjustment recommendation comprises adjustment data for avionics equipment.

In one embodiment, the method comprises steps for computing adjustment recommendations for the avionics equipment in an aircraft. These steps can include one or more of the following steps: acquiring data representing the context associated with the aircraft and its use and one or more types of recommendation, transmitting this context to a distinct computation means of the avionics; checking the conditions for requesting a recommendation using the context associated with the aircraft; computing at least one adjustment recommendation using the context and/or predetermined knowledge; filtering the recommendations to be transmitted to the avionics; transmitting, for each positive display/forwarding condition, the recommendation to the avionics equipment.

In one embodiment, a recommendation corresponds to the completion of an adjustment being edited by the crew. In one embodiment, the element triggering the recommendation for an adjustment can correspond to the ongoing (or imminent) editing of this adjustment by the crew and/or to the determination of a flying context that meets a predetermined set of conditions.

In one embodiment, the predetermined data includes avionics data relating to the operating aircraft, avionics data relating to ground-based equipment, data provided by one or more users, logged recommendations or data relating to one or more predetermined flight procedures.

In one embodiment, the step involving determining an adjustment recommendation is performed in an avionics type system. In one embodiment, the step involving determining an adjustment recommendation is performed in a nonavionics type system.

In one embodiment, the method further comprises the step involving determining a flying context similar to the received flying context, the adjustment recommendations include the adjustment recommendations of the similar flying context.

In one embodiment, the flying context is repeatedly determined over time.

In one embodiment of the invention, a recommendation is based on the flying context. In one embodiment, the flying context is repeatedly (or recurrently or intermittently) determined over time. The flying context can be repeatedly determined over time (e.g. every N seconds and/or depending on the actions of the pilot and/or the various waypoints or points of the flight plan and/or other points not necessarily associated with the waypoints). In one embodiment, the step involving determining the flying context comprises applying predetermined logic rules. Determining the flying context is based on values measured by the on-board instruments and/or received from outside (ATC, weather, etc.). The determination can be static (local and/or external means, but means that remain unchanged over time) or dynamic means (consideration of influences or of external control systems, for example, that vary over time). The determination can be complex (for example, can result from applying a large number of rules, relating to the aircraft, its flight, but also to the pilots and the environment outside the aircraft).

In one embodiment, the step involving determining the flying context involves applying predetermined logic rules.

In one embodiment, an avionics system is associated with a rate of physical failure that is less than, and a logic verification that is greater than, those of a non-avionics type system. In one embodiment, an avionics system is associated with a comprehensiveness of tests and/or of verifications that is greater than those of a non-avionics system.

In one embodiment, the rendering of recommendations is performed visually and/or audibly and/or by touch and/or by vibrations.

A computer program product is described, said computer program comprising code instructions for performing the steps of the method, when said program is executed on a computer.

A system is described for implementing the method for assisting the piloting of an aircraft, said system comprising at least one avionics type system and at least one non-avionics type system.

Figure 3:
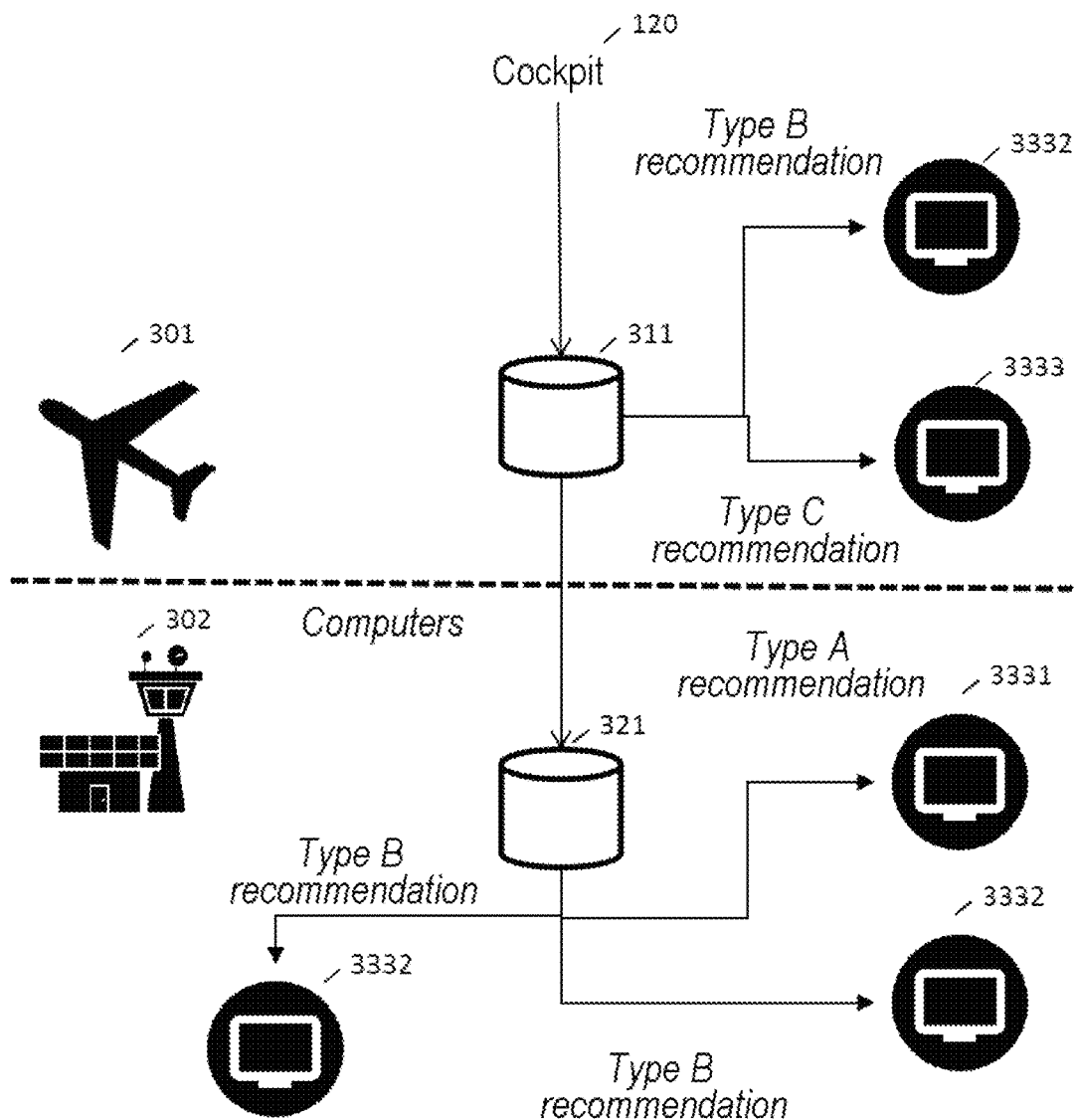
FIG. 3 shows an example of the distribution of the computations.

FIG. 3 shows an example of the distribution of the computations.

One or more of the steps of the method according to the invention can be performed locally (i.e. on-board the cockpit 120 of the aircraft 301) and/or require remote resources (for example, one or more computers housed by the air traffic control system 302). The recipients of the recommendations (i.e. the screens or displays that are used, indirectly targeting specific individuals or functions) can be varied. Various examples are provided hereafter. A type A recommendation 3331 can be exclusively intended, and therefore displayed, for a ground-based operator. A type B recommendation 3332 can be displayed on board by the entity 311 and also on the ground by the entity 321. A C type recommendation 3333 can be exclusively intended, and therefore displayed, for on board the aircraft. The entities 311 and 312 denote routing devices (physical units and/or software entities).

In a specific embodiment, a recommendation is displayed on the screens of the single FMS. In another embodiment, the information associated with the steps of the method is displayed on the only on-board EFBs. Finally, in another embodiment, the screens of the FMS and of an EFB can be used together, redundantly (copies) but also in a complementary manner (for example, by "distributing" the information over the various screens of the various devices).

A substantively relevant and shape-optimized distribution can help to reduce the cognitive load of the pilot and subsequently improve decision-making and increase flight security/safety.

The present invention can be implemented on the basis of hardware and/or software elements. It can be available as a computer program product on a computer readable medium. The medium can be electronic, magnetic, optical or electromagnetic.

A computer program product is described, said computer program comprising code instructions for performing one or more of the steps of the method, when said program is executed on a computer.

In one embodiment, the method is implemented by a computer.

In one embodiment, the system for implementing the invention comprises a computer-readable storage medium (RAM, ROM, flash memory or another type of memory technology, for example, a disc medium or another non-transitory computer-readable storage medium) coded with a computer program (i.e. several executable instructions), which program, when it is executed on a processor or on a plurality of processors, performs the functions of the previously described embodiments. By way of an example of hardware architecture that is adapted to implement the invention, a device can comprise a communication bus, to which a central processing unit (CPU) or microprocessor is connected, which processor can be "multicore" or "many-core"; a read-only memory (ROM) that can comprise the programs required to implement the invention; a random access (RAM) or cache memory comprising registers adapted to record variables and parameters created and modified during the execution of the aforementioned programs; and a communication interface or I/O ("Input/Output") adapted to transmit and to receive data.

In the event that the invention is installed on a reprogrammable computation machine (for example, an FPGA circuit), the corresponding program (i.e. the sequence of instructions) can be stored in or on a removable storage medium (for example, an SD card, or a mass storage medium, such as a hard drive, e.g. an SSD) or on a non-removable, volatile or non-volatile, storage medium, with this storage medium being partially or fully readable by a computer or a processor. The computer-readable medium can be transportable or communicable or movable or transmittable (i.e. by a 2G, 3G, 4G, Wi-Fi, BLE, optical fibre or other telecommunications network).

The reference to a computer program, which, when it is executed, performs any of the aforementioned functions, is not limited to an application program executing on a single host computer. On the contrary, the terms computer program and software are used herein in a general sense to refer to any type of computer code (for example, an application software, a micro-software, a micro-code, or any other form of computer instruction, such as web services or SOAs or via API programming interfaces) that can be used to program one or more processors for implementing aspects of the techniques described herein. The computer means or resources particularly can be distributed ("cloud computing"), optionally with or according to peer-to-peer and/or virtualization technologies. The software code can be executed on any suitable processor (for example, a microprocessor) or processor core or a set of processors, whether they are provided in a single computation device or are distributed between a plurality of computation devices (for example, such as those that are optionally accessible in the environment of the device). Security technologies (cryptoprocessors, optionally biometric authentication, encryption, chip card, etc.) can be used.

In some embodiments, the various steps of the method can be implemented in one or more items of avionics equipment and/or on one or more items of non-avionics equipment, for example, an EFB (Electronic Flight Bag) and/or tablets and/or an on-board or ground-based computer.

In addition, or as an alternative, to the avionics screens in the cockpit, additional HMI means can be used. In general, the avionics systems (which are systems certified by the aviation regulator and which can have certain limitations in terms of the display and/or of ergonomics) advantageously can be supplemented by non-avionics means, in particular advanced HMIs. Among these advanced HMIs, some embodiments of the invention can be implemented by enhanced reality AR (e.g. projectors, glasses, etc.) means and/or by virtual reality VR (e.g. visor, helmet-mounted display, etc.) means. Some embodiments can be mixed or hybrid AR/VR or, in other words, can combine EVS "Enhanced Vision System" and/or SVS "Synthetic Vision System" means. For example, projection means can project the information onto the windscreen and/or internal elements of the cockpit of the aircraft.

The invention claimed is:

1. A method, implemented in a system comprising an avionics type system and a non-avionics type system, for managing the adjustment of on-board equipment in the cockpit of an aircraft, the method comprising:

receiving, by the avionics type system avionics context data representative of a current flying context of the aircraft;

forwarding the avionics context data to the non-avionics type system;

determining, in the non-avionics type system, that data among the avionic context data meet one or more predetermined criteria or conditions;

triggering, in response to the determining that data among the avionic context data meet the one or more predetermined criteria or conditions, the computation of recommendations for adjusting one or more of the on-board equipment on the basis of at least one of the received avionics context data, of the current flying context, or of the predetermined data;

rendering the computed one or more adjustment recommendations for at least one of visual, audible, tactile, or vibratory restitution in the avionic type system; and confirming the computed one or more adjustment recommendations and, in response to the confirming of the computed one or more adjustment recommendations, adjusting the one or more of the on-board equipment based upon the computed one or more adjustment recommendations.

2. The method according to claim 1, further comprising receiving a request with a view to obtaining one or more adjustment recommendations, and verifying predetermined conditions of said request, said predetermined conditions comprising or indicating ongoing or imminent avionics adjustment activity by the crew and/or the validation, by a sub-party, of the contained data within the context of predetermined logic rules.

3. The method according to claim 1, further comprising selecting one or more recommendations from the computed adjustment recommendations, the selection criteria comprising degrees of reliability or confidence intervals associated with the various sources of the avionics and/or non-avionics data.

4. The method according to claim 1, wherein the predetermined data comprising avionics data relating to the operating aircraft and/or non-avionics data particularly comprising data relating to ground-based equipment, data provided by one or more users, logged recommendations or data relating to one or more predetermined flight procedures.

5. The method according to claim 1, wherein the triggering an adjustment recommendation being performed in at least one of a non-avionics type system or in an avionics type system.

6. The method according to claim 1, further comprising determining a flying context similar to the received flying context, and wherein the rendered and/or triggering adjustment recommendations comprising the adjustment recommendations associated with the similar flying context.

7. The method according to claim 1, wherein the recommendations for adjusting one or more of the on-board equipment comprise the completion of an adjustment of equipment that is being edited requiring a single validation.

8. The method according to claim 1, wherein the rendering is performed by graphic display means on one or more existing screens in the cockpit and/or by projecting information into the cockpit.

9. The method according to claim 8, wherein the rendering is performed on one or more predetermined display screens.

10. The method according to claim 8, further comprising displaying on a projector accessibility information relating to one or more items of equipment associated with one or more adjustment recommendations.

11. The method according to claim 1, wherein the rendering the adjustment recommendation is deferred over time.

12. The method according to claim 1, wherein the avionics type system is associated with a rate of physical failure that is less than, and a logic verification that is greater than, those of the non-avionics type system.

13. The method according to claim 1, wherein the avionics type system is associated with at least one of a comprehensiveness of tests or verifications that are greater than those of the non-avionics type system.

14. A non-transitory computer readable medium comprising a computer program product, said computer program product comprising instructions that when implemented on a computer cause the computer to automatically perform the method according to claim 1.

15. A system for implementing the method according to claim 1, for assisting the piloting of an aircraft, said system comprising the avionics type system and the non-avionics type system.

* * * * *